US012531489B2

(12) United States Patent
Dujic et al.

(10) Patent No.: US 12,531,489 B2
(45) Date of Patent: Jan. 20, 2026

(54) METHOD FOR OPERATING A POWER CONVERTER AND POWER CONVERTER

(71) Applicant: ECOLE POLYTECHNIQUE FEDERALE DE LAUSANNE (EPFL), Lausanne (CH)

(72) Inventors: Drazen Dujic, Belmont-Lausanne (CH); Jakub Kucka, Ecublens VD (CH)

(73) Assignee: Ecole Polytechnique Federale De Lausanne (EPFL), Lausanne (CH)

( * ) Notice: Subject to any disclaimer, the term of this patent is extended or adjusted under 35 U.S.C. 154(b) by 181 days.

(21) Appl. No.: 18/682,393

(22) PCT Filed: Aug. 9, 2022

(86) PCT No.: PCT/EP2022/072361
§ 371 (c)(1),
(2) Date: Feb. 8, 2024

(87) PCT Pub. No.: WO2023/017042
PCT Pub. Date: Feb. 16, 2023

(65) Prior Publication Data
US 2024/0266963 A1    Aug. 8, 2024

(30) Foreign Application Priority Data

Aug. 10, 2021   (EP) .................... 21190559

(51) Int. Cl.
*H02M 3/335*   (2006.01)
*H02M 1/00*    (2006.01)
(Continued)

(52) U.S. Cl.
CPC ..... *H02M 3/33571* (2021.05); *H02M 1/0058* (2021.05); *H02M 1/08* (2013.01);
(Continued)

(58) Field of Classification Search
CPC .. H02M 3/33571; H02M 1/0058; H02M 1/08; H02M 1/32; H02M 1/38
See application file for complete search history.

(56) References Cited

U.S. PATENT DOCUMENTS

| 8,804,377 B2 * | 8/2014 | Adragna | ............. | H02M 3/3376 363/21.02 |
| 2007/0018618 A1 * | 1/2007 | Endo | .................... | H02M 3/1588 323/224 |

(Continued)

FOREIGN PATENT DOCUMENTS

CN          108267677 A       7/2018

OTHER PUBLICATIONS

Akimasa Niwa et al, "A Dead-Time-Controlled Gate Driver Using Current-Sense FET Integrated in SiC MOSFET," IEEE Transactions on Power Electronics, vol. 33, No. 4, Apr. 2018, pp. 3258-3267.

(Continued)

*Primary Examiner* — Adolf D Berhane
*Assistant Examiner* — Afework S Demisse
(74) *Attorney, Agent, or Firm* — Andrus Intellectual Property Law, LLP

(57) ABSTRACT

The present invention relates to a method for operating a resonant power converter. The resonant power converter has a primary stage and a secondary stage, at least one of which is actively operated and includes a half-bridge or full-bridge inverter having a pull-up switching device, coupled in parallel with a pull-up antiparallel diode and a pull-down switching device, coupled in parallel with a pull-down antiparallel diode, comprising the steps of alternately turning-off and turning on the pull-up and pull-down switching devices according to a periodic switching scheme, wherein after turning-off one of the switching devices the complementary switching device is respectively turned on after a delay time; and initiating an error handling, if after turning- (Continued)

off of one of the switching devices a non-conductance state of the antiparallel diode of the complementary switching device has been determined.

10 Claims, 4 Drawing Sheets

(51) Int. Cl.
   *H02M 1/08*    (2006.01)
   *H02M 1/32*    (2007.01)
   *H02M 1/38*    (2007.01)
   *H02M 3/00*    (2006.01)

(52) U.S. Cl.
   CPC ............... *H02M 1/32* (2013.01); *H02M 1/38* (2013.01); *H02M 3/01* (2021.05)

(56) References Cited

U.S. PATENT DOCUMENTS

| | | |
|---|---|---|
| 2015/0229225 A1 | 8/2015 | Jang |
| 2016/0209853 A1 | 7/2016 | Deboy |
| 2019/0006940 A1* | 1/2019 | Jans ........................ H02M 1/08 |
| 2019/0123653 A1 | 4/2019 | Michal |

OTHER PUBLICATIONS

M. E. dos Santos and B. J. C. Filho, "Short circuit and overcurrent protection of IGCT-based three-level NPC inverters," 2004 IEEE 35th Annual Power Electronics Specialists Conference (IEEE Cat. No. 04CH37551), Aachen, Germany, 2004, pp. 2553-2558 vol. 4, doi: 10.1109/PESC.2004.1355231.

H. Zeng et al., "IGCT Self-Protection Strategy for IGCT Converters," 2019 10th International Conference on Power Electronics and ECCE Asia (ICPE 2019-ECCE Asia), Busan, Korea (South), 2019, pp. 793-798, H. Zeng et al., "An IGCT anode current detecting method based on Rogowski coil," 2017 IEEE Applied Power Electronics Conference and Exposition (APEC), Tampa, FL, 2017, pp. 1480-1483, doi: 10.1109/APEC.2017.7930894.

T. Butschen, G. S. Etxeberria, H. Stagge, and R. W. De Doncker, "Gate drive unit for a Dual-GCT," 8th International Conference on Power Electronics—ECCE Asia, Jeju, Korea (South), 2011, pp. 2419-2426, doi: 10.1109/ICPE.2011.5944717.

International Search Report for Application No. PCT/EP2022/072361, dated Oct. 24, 2022.

* cited by examiner

METHOD FOR OPERATING A POWER CONVERTER AND POWER CONVERTER

CROSS-REFERENCE TO RELATED APPLICATIONS

This application is the U.S. national stage application of International Application No. PCT/EP2022/072361, filed on Aug. 9, 2022, which international application was published on Feb. 16, 2023, as International Publication WO 2023/017042 A1 in the English language. The international application is incorporated herein by reference, in its entirety. The international application claims priority from European Patent Application No. 21190559.1, filed on Aug. 10, 2021, which is incorporated herein by reference, in its entirety.

TECHNICAL FIELD

The present invention relates to power converters that provide zero-voltage turn-on for the switching of the power converter. Particularly, the present invention relates to methods to prevent short circuit failures through switching devices of the power converter.

TECHNICAL BACKGROUND

A main component of power converters comprises a series connection of two (or more) power switching devices between a high and a low supply potential, typically defined by capacitive storage elements, e.g. DC link capacitors. The power switching devices can be separately controlled to selectively apply one of the high and the low potential at the intermediate terminal. In high-power medium-voltage applications, thyristor-based power switches, such as gate turn-off thyristor (GTO) or integrated gate-commutated thyristor (IGCT), have proven to achieve remarkable efficiencies and high power densities. These power switches are robust and reliable and allow high-voltage and high-current ratings which are beneficial for power conversion applications in the Megawatt range.

Due to their internal construction, the thyristor-based power switches fail exclusively in short circuit which can be taken advantage of for series-connection redundancy in high voltage converters or applications. This can also cause problems, in case that a failure of the power switch is not recognized and a further power switch is turned on, eventually causing a short circuit of the supply.

The switching losses of these power switching devices are usually disadvantageous which limits the switching frequency to significantly below 1 kHz. Furthermore, the switching devices require some additional circuitry to limit the rate of current rise during the turn-on phase. The additional circuitry is often implemented as a clamping circuitry. A typical clamping circuitry has a serial inductor and a parallel capacitance in series with a diode coupled between the supply voltage and the converter.

To enable high switching frequencies while maintaining high conversion efficiency, the thyristor-based switching devices can be utilized in resonant topologies that possess soft switching capabilities. Soft switching is achieved utilizing additional circuit elements and can be generally realized as zero-current switching (ZCS) or zero-voltage switching (ZVS). With ZVS, the external circuit elements provide zero-voltage conditions across power switching devices before the turn-on command is issued. As a result, the switching losses can be minimized improving the overall efficiency.

Unlike the hard-switched applications, in which the clamping circuitry is an inseparable part of the converter, it can be omitted in the resonant converters as the rising rate of the switched current is naturally limited by the resonant tank.

Usually, the power switching devices are provided as a series connection wherein each power switching device is a parallel connection of a thyristor-based switch with an antiparallel diode. A series connection of the power switching devices is coupled with the supply voltage which may be buffered by one or more DC link capacitors to suppress the switching effects in the supply lines. In order to prevent a fatal failure of the converter, the switching devices should be protected against the turn-on into a short circuit to avoid a shoot-through through the DC link capacitor.

With omitting the clamping circuitry in resonant-converter applications, the shoot-through can no longer be mitigated by the clamping inductor which reduces the rate of the current rise during the active switching and protects at the same time the antiparallel diode from an excessive rate of change of the current. As a consequence, without the clamping circuitry, there is a need to protect the power switching devices and the whole power converter by different means.

During the operation of a resonant power converter, the most likely point in time for the switching devices to fail is during the turn-off when the switching overvoltages are generated and the instantaneous losses within the device are increased. In applications using thyristor-based power-switching devices, occurrences of those faults cannot be recognized by the devices themselves. Basically, in typical applications, the time to recognize such a failure as from issuing the turn-off command to the instant when the turn-on command is issued for the complementary switching device is fairly short, e.g. between a few microseconds to tens of microseconds. If the failure is not recognized, the complementary switching device would be turned on causing a short circuit through the switching devices thereby affecting the DC link capacitor (shoot-through) and likely damaging the power converter.

Conventionally, the short circuit due to the failure in the switching devices is recognized by secondary effects, such as rising current in the damaged switching device and other closed devices. Numerous techniques are described in the literature to measure or estimate this current.

M. E. dos Santos and B. J. C. Filho, "Short circuit and overcurrent protection of IGCT-based three-level NPC inverters," 2004 IEEE 35th Annual Power Electronics Specialists Conference (IEEE Cat. No. 04CH37551), Aachen, Germany, 2004, pp. 2553-2558 Vol. 4, doi: 10.1109/PESC.2004.1355231 discloses to directly measure the current flowing through the inductors of the clamping circuit by using an ADC and a shunt resistor. If the current becomes too high, it is determined that some of the devices have failed and caused a short circuit.

From documents H. Zeng et al., "IGCT Self-Protection Strategy for IGCT Converters," 2019 10th International Conference on Power Electronics and ECCE Asia (ICPE 2019—ECCE Asia), Busan, Korea (South), 2019, pp. 793-798, H. Zeng et al., "An IGCT anode current detecting method based on Rogowski coil," 2017 IEEE Applied Power Electronics Conference and Exposition (APEC), Tampa, F L, 2017, pp. 1480-1483, doi: 10.1109/APEC.2017.7930894 and CN108267677A the integration of a Rogowski coil with an integrator into the gate driver is known. The overcurrent that signifies a short circuit can be detected very quickly.

As known from document T. Butschen, G. S. Etxeberria, H. Stagge, and R. W. De Doncker, "Gate drive unit for a Dual-GCT," 8th International Conference on Power Electronics—ECCE Asia, Jeju, Korea (South), 2011, pp. 2419-2426, doi: 10.1109/ICPE.2011.5944717 monitoring the current is made by observing the on-state voltage drop using a high-voltage diode and an operational amplifier. Once the detected on-state voltage drop of the switch crosses a defined value, the current is recognized as too high and the switch is turned off.

These failure detecting methods all require a clamping circuitry to limit the gradient of the rising current to effectively enable a possibility to react to the failure. However, these measures cannot be used for applications in resonant converters not provided with a clamping circuitry.

In document US 2016/209853 A1, a method is proposed to protect a MOSFET as a switching device from hard switching. The voltage over the switching device is monitored to determine when the hard switching is likely to happen. The converter topologies that were designed for soft switching operation repeated hard switching events could cause the failure of the devices. If the hard switching is likely to occur, the turn-on of the corresponding MOSFET is delayed.

It is an object of the present invention to provide a method for operating a resonant power converter for soft switching wherein in case of a failure a short circuit is securely avoided. The method shall be particularly suited for power switches that fail into short circuit, ensured by means of their internal design.

SUMMARY OF THE INVENTION

According to the present invention, there is provided a method for operating, for protection against short circuit, a resonant power converter which is operated in a soft-switching scheme according to claim 1 and a resonant power converter according to the further independent claim.

Further embodiments are indicated in the depending subclaims.

According to a first aspect, a method for operating a resonant power converter is provided having a primary stage and a secondary stage at least one of which is actively operated and includes a half-bridge or full-bridge inverter having a pull-up switching device coupled in parallel with a pull-up antiparallel diode and a pull-down switching device coupled in parallel with a pull-down antiparallel diode, comprising the steps of:

alternately turning-off and turning on the pull-up and pull-down switching devices according to a periodic switching scheme, wherein after turning-off one of the switching devices the complementary switching device is respectively turned on after a delay time;

initiating an error handling, if after turning-off of one of the switching devices, a non-conductance state of the antiparallel diode of the complementary switching device has been determined.

Conventionally, resonant power converters have an active stage provided by at least one active inverter with switching devices which are coupled in series. Each of the switching devices is provided in parallel with an intrinsic or external antiparallel diode. An intermediate terminal, which is located where the serially coupled switching devices are interconnected, is coupled with a resonant tank. The resonant tank includes capacitances and/or inductivities to smoothen the output of the active stage.

Conventionally, a resonant power converter has a control unit which is configured to control the operation of the active state to output a substantial square wave stage output voltage to be applied to the resonant tank. As a result, the square wave stage output voltage results in a resonant tank current which is basically sinusoidal, but can contain other harmonic components as well. Moreover, the period of sinusoidal tank current lags behind the period of the square wave stage output voltage. In other words, there is a phase shift between the resonant tank current and the square wave stage output voltage. This essentially provides the condition for the zero voltage switching of the respective switching device that is to be turned on into as there is enough time to detect the presence of the condition when the voltage crosses the zero-line.

Furthermore, the delay time may be fixed or determined by a soft-switching scheme, such as zero voltage switching.

Basically, the central control unit which may include a microcontroller or any different kind of processing unit, provides a control signal for a control terminal of a respective gate unit coupled with the respective one of the switching devices. In general, the gate unit is configured to drive the control signal of the control unit to control the switching device since the central control unit cannot generate enough current and voltage to drive the power switching devices. Therefore, the gate unit (gate driver) is used to amplify the control signal of control unit to apply a driven control signal at a control terminal of the switching devices, respectively. Commonly, the gate unit is directly arranged or close to the switching device, while the control unit may be arranged remotely. For example the gate unit can be implemented in one module with the respective switching device, while the control unit is located remote from the module.

One of the above methods for operating the resonant power converter provides monitoring of the anode-to-cathode voltage across the switching devices. Substantially, when the pull-up switching device is actively turned off via its control terminal, the anode-to-cathode voltage across this switching device rises rapidly until the switching device fully blocks the DC link voltage. After the resonant tank current has been commutated from the respective (turned-off) pull-up switching device to the complementary antiparallel diode, which is here the pull-down antiparallel diode in the pull-down branch that naturally turns on at the time of turning-off of the pull-up switching device, generates a positive voltage drop over it. The pull-down switching device is firstly turned on after a short delay (dead time) when the pull-down antiparallel diode is already conducting. As a consequence, the pull-down switching device is turned on with a zero voltage drop generating virtually no turn-on losses according to the soft-switching scheme. The situation is analogous, when the pull-down switching device is turned off and the pull-up antiparallel diode turns on and takes over the current before the pull-up switching device turns on according to the zero voltage switching scheme.

To make use of this ZVS switching scheme, above method for operating the resonant power converter provides that for each of the switching devices the diode current of the associated antiparallel diode of the switching device is monitored briefly before, at or briefly after the time when the turn-on command shall be applied to the respective switching device. The conduction state of the antiparallel diode is monitored by observing the voltage drop over the antiparallel diode and the corresponding switching device. If it is determined that at the time when the turn-on command is available the antiparallel diode is electrically conducting, the corresponding switching device is allowed to be turned on.

The conducting antiparallel diode signifies that the turning-off of the current switching device has not failed. Such a monitoring can be realized directly on the gate unit (gate driver) or on a dedicated electronic circuit connected across the switching device or in a central control unit.

According to an embodiment, the error handling may include at least one of delaying, suppressing, and blocking the turning-on of the switching device to be subsequently turned on and halting the operation of the power converter.

Therefore, if the antiparallel diode is not going into a conductive state at the planned time instant, the turning-off of the respective switching device has likely failed or the turn-off takes longer than expected. In this case, the turn-on of the respective other (subsequent) switching device may be delayed or blocked to stop the converter operation completely or to wait until the antiparallel diode is conducting the turn-on of the switching device later.

One advantage of this method is that since only local information is used for the method, i.e. the switching control signal for the switching devices and the voltage drop over the switching device and its antiparallel diode, it can be implemented locally, e.g. directly in the gate unit.

Furthermore, the conductance state of the respective antiparallel diode may be determined by detecting a voltage drop over the respective antiparallel diode.

Particularly, the checking if the voltage drop over the antiparallel diode indicated a conductance state may be started before or immediately after receiving the turning-on command for the respective switching device.

It may be provided that the checking if the voltage drop over the antiparallel diode indicated a conductance state is performed in a respective gate unit associated with each of the switching devices.

Moreover, if it is determined that no voltage drop over the antiparallel diode occurred a failure may be communicated from the gate unit to a control unit providing the turning-on command.

According to a further aspect, a resonant power converter comprises:
 a primary stage and a secondary stage at least one of which is actively operated and includes a half-bridge or full-bridge inverter, wherein the primary stage and the secondary stage are coupled via a resonant tank, wherein the half-bridge or full-bridge inverter has a pull-up switching device coupled in series with a pull-down switching device, wherein the pull-up switching device is coupled in parallel with a pull-up antiparallel diode and a pull-down switching device coupled in parallel with a pull-down antiparallel diode, and
 a control unit configured to command the switching devices for turning on or turning off, wherein the control unit is further configured to
  alternately provide turning-off and turning-on commands for controlling the pull-up and pull-down switching devices according to a periodic switching scheme, wherein after providing a turning-off command for one of the switching devices it is provided a turning-on command for the complementary switching device after a delay time;
wherein the power converter is configured to initiate an error handling, if, particularly immediately, after turning-off of one of the switching devices a non-conductance state of the antiparallel diode of the complementary switching device has been determined;
Furthermore, for each of the switching devices a gate unit may be provided which is configured to drive the control signal including turning-off and turning-on commands to be applied to the respective switching device, wherein each gate unit is further configured to
 receive a turning-on command from the control unit;
 after receipt of the turning-on command, check if the voltage drop over the antiparallel diode associated with the respective switching device indicated a conductance state of the respective antiparallel diode;
 block the control signal from applying at the respective switching device if a non-conductance state has been detected.

According to an embodiment, each gate unit may be located closely with the respective switching device or is implemented in a single module with the respective switching device, while the control unit is located remotely therefrom.

BRIEF DESCRIPTION OF THE DRAWINGS

Embodiments are described in more detail in conjunction with the accompanying drawings in which.

DETAILED DESCRIPTION OF EMBODIMENTS

Figure 1:
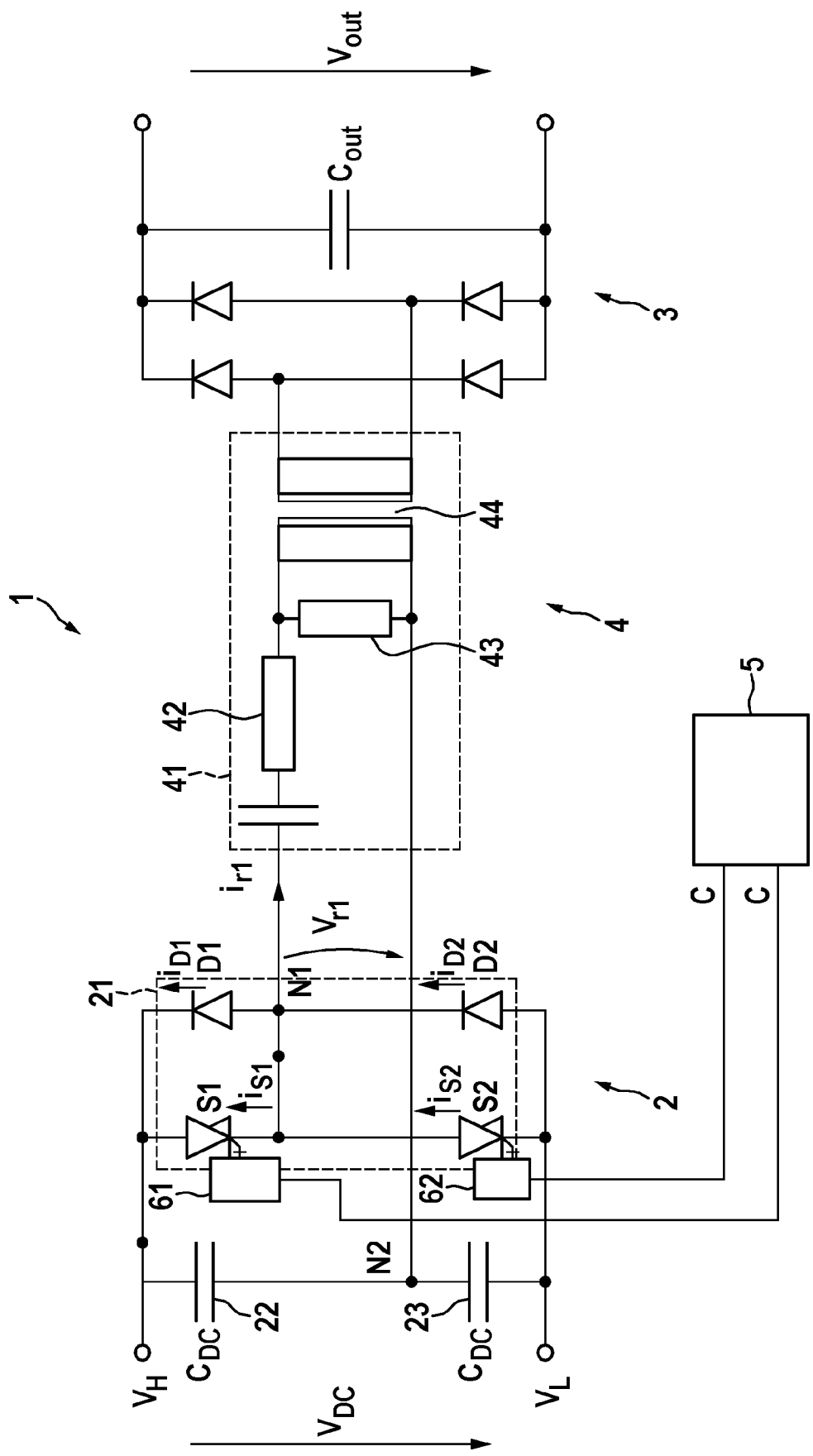
FIG. 1 schematically shows a circuitry of an exemplary DC/DC power resonant converter in a resonant topology.

FIG. 1 exemplarily shows a DC/DC resonant power converter 1. The shown topology considers a unidirectional topology and has as a primary active stage 2 an inverter in half-bridge topology and a diode rectifier as a secondary passive stage 3. In other embodiments, also bidirectional topologies where both stages, primary side and secondary side, may be actively operated. Further, for each of the stages, full bridges or multi-level topologies can be alternatively applied if an inverter as described below is involved.

Between the primary stage 2 and the secondary stage 3, a resonant tank 4 is provided which may include discrete passive components 41, 42, 43, and 44 are integrated. For example the resonant tank 4 includes a series connection of a capacitance 41 and an inductance 42 which is coupled with a parallel connection between a further inductance 43 and a medium frequency transformer 44. The inductances 42, 43 may be part of the medium frequency transformer 44.

The primary stage 2 includes an inverter 21 in a half-bridge topology comprising a pull-up switching device S1 and a pull-down switching device S2 connected in series between supply terminals $V_H$, $V_L$ of the DC link voltage $V_{DC}$. The switching devices are formed as thyristor-based power switches, such as GTO or IGCT. The supply terminals are further connected with a series connection of two DC link capacities 22, 23 providing a first middle node N1 to connect with the resonant tank 4. A second middle node N2 between the series connection of the switching devices S1, S2 is further connected with another terminal of the resonant tank 4.

The pull-up switching device S1 is connected in parallel with a pull-up antiparallel diode D1, while the pull-down switching device S2 is connected in parallel with a pull-down antiparallel diode D2. The secondary stage 3 may be formed by a diode rectifier followed by an output capacitance $C_{out}$ to provide a smooth DC output voltage $V_{out}$.

For operating the resonant power converter 1, a control unit 5 is provided which generates the control "turning-on" and "turning-off" commands for the switching devices S1, S2 to be conductive or non-conductive, i.e. to turn on or to turn off. These commands may be translated in the gate units 61 and 62 that control the switching devices S1 and S2, respectively. Usually, the control unit 5 may be configured to control the switching devices S1, S2 via the gate units 61, 62 so that the switching devices S1, S2 are intermittently closed/turned-on or opened/turned-off so that at the same time only one of the switching devices S1, S2 is conductive, while the other one is non-conductive. The switching is usually made with a predetermined frequency of e.g. 1 kHz to 5 kHz. Other switching frequencies are possible.

Furthermore, in parallel to the pull-up switching device S1 and therefore in parallel to the pull-up antiparallel diode D1 a pull-up voltage measurement may be provided in the gate unit 61 or separately therefrom. Analogously, in parallel to the pull-down switching device S2 and therefore in parallel to the pull-down antiparallel diode D2 a pull-down voltage measurement may be provided in the gate unit 62 or separately therefrom.

When one of the switching devices S1, S2 is turned off, i.e. switched from the conductive state to the non-conductive state, the control unit 5 waits for a time of about several microseconds, before turning on the respective other switching device S2, S1 to avoid any short current flowing through the inverter having both switching devices turned-on. Alternatively, such a turning-on delay function can also be implemented/performed by the gate units 61 and 62, respectively.

If due to a failure, the turning-off of one of the switching devices S1, S2 is not correctly carried out, the subsequent turning-on of the respective other switching device S1, S2 would cause a short circuit which would lead to a strong rising of a current through the DC link capacitors 22, 23 possibly damaging the components.

While in conventional applications, a clamping circuit is provided on the input side of the primary stage to limit a current rise through the DC link capacitors an error handling is implemented in the gate units 61 and 62 to prevent turning on of one of the switching devices into a short circuit state. Alternatively, the error handling can also be implemented in the control unit 5.

Figure 2:
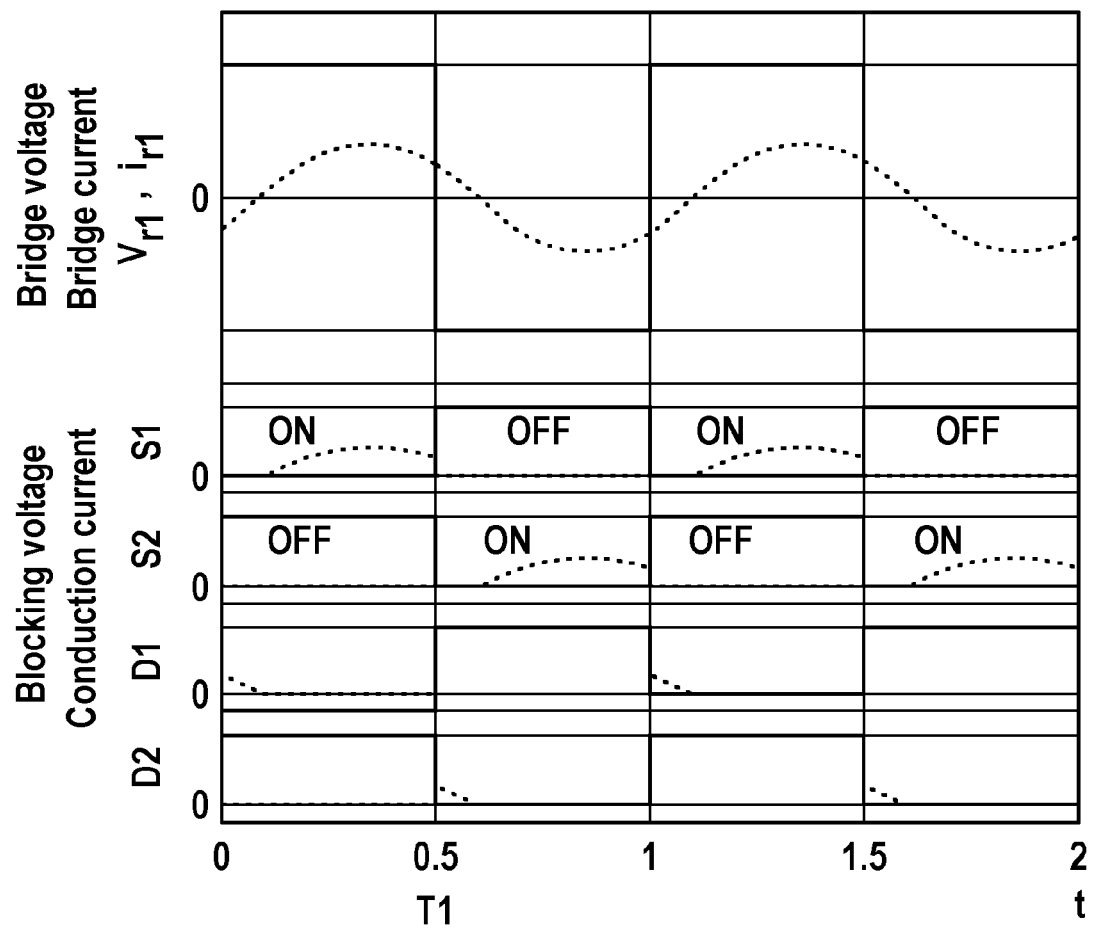
FIG. 2 a signal time diagram of the voltages and currents in the resonant power converter of FIG. 1.

A normal operation of the resonant power converter 1 is illustrated by means of the signal-to-time diagram of FIG. 2 showing the bridge voltage $V_{r1}$ between the first and the second middle node N1, N2, the bridge current $i_{r1}$ through the resonant tank 4 and voltages over the switching devices S1, S2, the voltages over the antiparallel diodes D1, D2 and the conduction currents flowing through the switching devices S1, S2, referenced by $i_{S1}$, $i_{S2}$ and conduction currents flowing through the antiparallel diodes D1, D2, referenced by $i_{D1}$, $i_{D2}$, respectively. Solid lines show voltage patterns and dashed lines show current patterns.

It can be seen that when the pull-up switching device S1 is actively turned off at time T1, controlled by the control unit 5, the anode-to-cathode voltage across the switching device S1 rises rapidly until the switching device S1 fully blocks the applied DC link voltage, the resonant link tank current ir1 is commutated from this switching device S1 to the complementary antiparallel diode S2 almost immediately. This can be seen in the current flow through the pull-down antiparallel diode S2, which turns on as soon as the turning-off of the pull-up switching device S1 occurs.

Once the current flow is detected by a low voltage drop detected with a corresponding measurement unit, the pull-down switching device S2 may be turned on only after a short delay of a dead time as an ordinary turning-off function of the pull-up switching device S1 has been determined.

The regular turn-on time may be triggered by the voltage drop over the pull-down switching device S2 corresponding to the voltage over the complementary (pull-down) antiparallel diode D2. As a consequence, the pull-down switching device S2 is turned on when a zero voltage exists over the pull-down antiparallel diode D2 generating virtually no turn-on losses. This switching scheme is called soft switching.

By monitoring the voltage drop over the switching devices S1, S2, it can be recognized whether the corresponding antiparallel diode D1, D2 has rendered conductive prior to regularly turning on the respective other switching device S1, S2 according to a fixed dead time or according to a zero voltage switching control (soft switching).

Therefore, it can be implemented in the control unit 5 or preferably in gate units 61 and 62 to monitor the voltage drop over the corresponding switching device S1, S2 to determine if the complementary switching device S2, S1 has not been ordinary turned off and has likely failed. The corresponding gate unit 61, 62 then can block the subsequent turning-on of the respective other switching device S1, S2 to block the converter operation protecting the power converter from a shoot-through.

Figure 3:
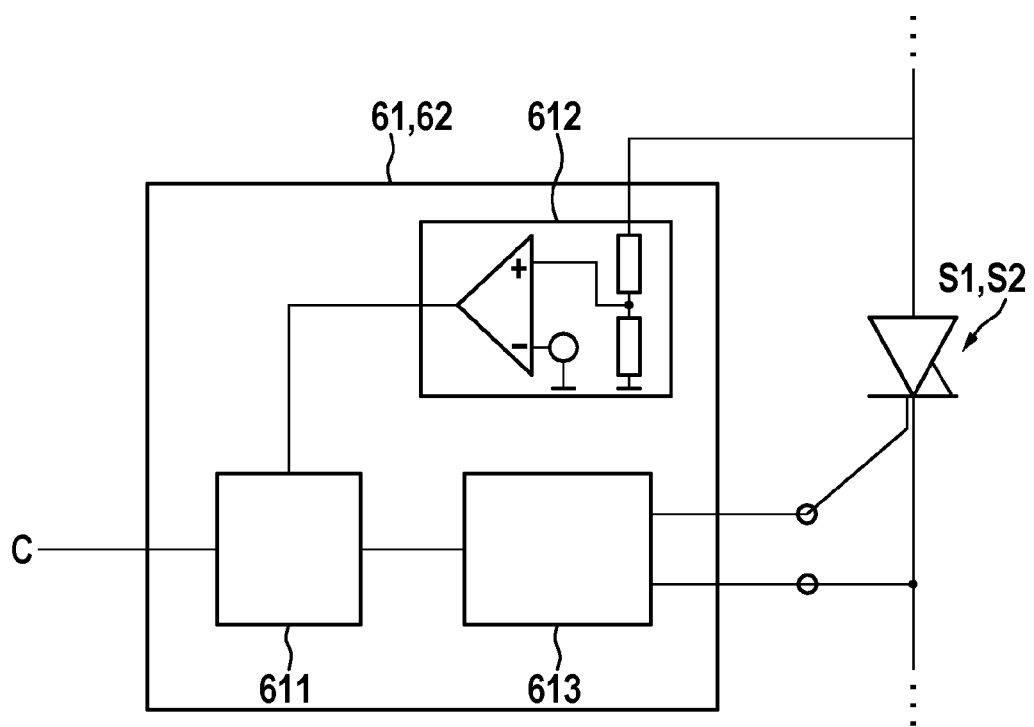
FIG. 3 a more detailed diagram of the gate unit.

FIG. 3 shows a more detailed diagram of each of the gate units 61, 62. The gate unit 61, 62 is controlled by the control signal C from the control unit separately provided for each of the switching devices S1, S2. In the present embodiment the voltage evaluation for the respective pull-up or pull-down branch is made in the gate unit 61, 62 by a respective voltage evaluation unit 612. By means of a logic unit 611 the control signal C is forwarded to a driving unit 613 if the branch (pull-up or pull-down) voltage exceeds a given threshold voltage Vth. Therefore, the voltage evaluation unit 612 includes a comparator to provide a comparison to output a digital signal to the logic unit 611 when the branch voltage exceeds the given threshold voltage Vth.

The driving unit 613 serves to drive the output signal from the logic unit 611 to a voltage/current level to securely switch the switching device S1, S2.

The logic unit 611 forward the control signal commanding a turning-on of the switching device S1, S2 to the driving unit 613 only if the branch voltage exceeds the threshold voltage Vth. The evaluation whether the voltage drop over the antiparallel diode indicated a conductance state is made before or immediately after receiving the turning-on command for the respective switching device S1, S2.

One of the advantages of above configuration is that the logic to ensure an error handling which suppresses or blocks the turning-on of the switching device S1, S2 to be subsequently turned on or halting the operation of the power converter, is implemented locally in the gate units 61, 62. By relating the turning-on of the respective switching device S1, S2 to the branch voltage of the branch which is associated with the respective gate unit 61, 62 the implementation of the error handling is limited to the respective gate unit 61, 62. This is because gate unit 61 that controls switch S1 only needs the information from the voltage evaluation unit 612 in the same gate unit 61 to determine whether turning-on of switch S1 is safe. Analogously, gate unit 62 that controls switch S2 only needs information from the voltage evaluation unit 612 in the same gate unit 62 to determine whether turning-on of switch S2 is safe.

Figure 4:
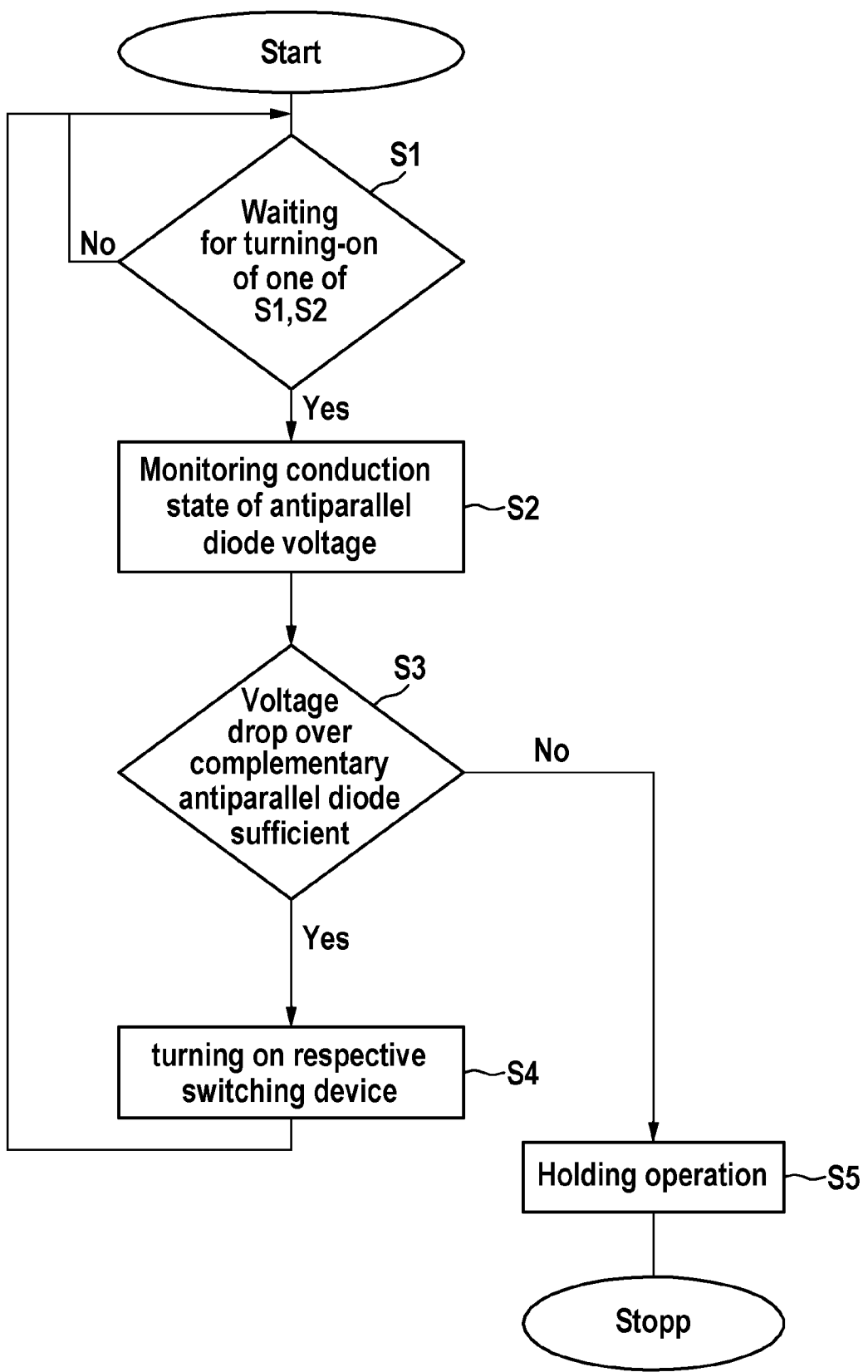
FIG. 4 a flowchart illustrating the scheme of operation of the control unit or the gate unit for one of the switches.

FIG. 4 shows a flowchart illustrating the method for each switching device S1, S2 which may be performed in the gate units 61, 62 for respective switching devices S1, S2. The method is explained for a state where S1 is conductive and S2 is non-conductive at the beginning.

The method starts with step S1 where it is waited for the turn-on command for the pull-down switching device S2 according to the switching scheme implemented in the control unit 5.

Once the turn-on command for the pull-down switching device S2 has been received (Alternative: Yes), the conducting state of the pull-down antiparallel diode D2, is monitored in step S2. This is typically made by monitoring the voltage drop (branch voltage) over the pull-down antiparallel diode D2. The voltage drop may be measured via the comparator as described above, checking that the voltage dropped sufficiently (over a threshold voltage Vth).

In step S3, it is checked whether a sufficient voltage drop over the pull-down switching device S2 could be detected. If yes, the method is continued with step S4, otherwise it is continued with step S5.

In step S4, the pull-down switch S2 is turn on, according to planned turn-on command of the control signal.

In step S5, when it has been determined that the complementary antiparallel diode has not been rendered conductive, an error handling is initiated. For example, the operation is halted and all turn-on signals are blocked. This may be made by a signal communication between the gate units 61, 62 to the control unit 5. Error handling may further comprise to wait until the respective non-conductive antiparallel diode is rendered conductive to turn on the switching device S1, S2 later.

The invention claimed is:

1. A method for operating a resonant power converter having a primary stage and a secondary stage at least one of which is actively operated and includes a half-bridge or full-bridge inverter having a pull-up switching device coupled in parallel with a pull-up antiparallel diode and a pull-down switching device coupled in parallel with a pull-down antiparallel diode, comprising the steps of:
   alternately turning-off and turning on the pull-up and pull-down switching devices according to a periodic switching scheme, wherein after turning-off one of the switching devices the complementary switching device is respectively turned on after a delay time; and
   initiating an error handling, if after turning-off of one of the switching devices a non-conductance state of the antiparallel diode of the complementary switching device has been determined.

2. The method according to claim 1, wherein the delay time is fixed or determined by a soft-switching scheme, such as zero voltage switching.

3. The method according to claim 1, wherein the error handling includes at least one of delaying, suppressing, and blocking the turning-on of the switching device to be subsequently turned on and halting the operation of the power converter.

4. The method according to claim 1, wherein the conductance state of the respective antiparallel diode is determined by detecting a voltage drop over the respective antiparallel diode.

5. The method according to claim 4, wherein the checking, if the voltage drop over the antiparallel diode indicated the conductance state, is started before or immediately after receiving the turning-on command for the respective switching device.

6. The method according to the claim 4, wherein the checking, if the voltage drop over the antiparallel diode indicated the conductance state, is performed in a respective gate unit each associated with one of the switching devices.

7. The method according to the claim 6, wherein if it is determined, that no voltage drop over the antiparallel diode occurred, a failure is communicated from the gate unit to a control unit providing the turning-on command.

8. A resonant power converter, comprising:
   a primary stage and a secondary stage at least one of which is actively operated and includes a half-bridge or full-bridge inverter, wherein the primary stage and the secondary stage are coupled via a resonant tank, wherein the half-bridge or full-bridge inverter has a pull-up switching device coupled in series with a pull-down switching device, wherein the pull-up switching device is coupled in parallel with a pull-up antiparallel diode and a pull-down switching device coupled in parallel with a pull-down antiparallel diode,
   a control unit configured to:
      command the switching devices for turning-on or turning off; and
      alternately provide turning-off and turning-on commands for controlling the pull-up and pull-down switching devices according to a periodic switching scheme, wherein after providing a turning-off command for one of the switching devices it is provided a turning-on command for the complementary switching device after a delay time;
   wherein the power converter is configured to initiate an error handling, if, particularly immediately, after turning-off of one of the switching devices a non-conductance state of the antiparallel diode of the complementary switching device has been determined.

9. The resonant power converter according to claim 8, wherein for each of the switching devices a gate unit is provided which is configured to drive the control signal including turning-off and turning-on commands to be applied to the respective switching device, wherein each gate unit is further configured to:
   receive a turning-on command from the control unit;
   after receipt of the turning-on command, check if the voltage drop over the antiparallel diode associated with the respective switching device indicated a conductance state of the respective antiparallel diode; and
   block the control signal from applying at the respective switching device if a non-conductance state has been detected.

10. The resonant power converter according to claim 9, wherein each gate unit is located closely with the respective switching device or is implemented in a single module with the respective switching device, while the control unit is located remotely therefrom.

\* \* \* \* \*